(12) United States Patent
Foreman

(10) Patent No.: US 11,724,859 B2
(45) Date of Patent: Aug. 15, 2023

(54) FOOD CONTAINERS WITH GAS DIVERSION

(71) Applicant: Marc Foreman & Connie Foreman, as Trustees of the Marc & Connie Foreman Family Trust, Woodland Hills, CA (US)

(72) Inventor: Marc Franklin Foreman, Woodland Hills, CA (US)

(*) Notice: Subject to any disclaimer, the term of this patent is extended or adjusted under 35 U.S.C. 154(b) by 31 days.

(21) Appl. No.: 17/460,773

(22) Filed: Aug. 30, 2021

(65) Prior Publication Data

US 2023/0062735 A1    Mar. 2, 2023

(51) Int. Cl.
| | |
|---|---|
| B65D 25/04 | (2006.01) |
| A47J 47/08 | (2006.01) |
| A45C 13/02 | (2006.01) |
| A45C 11/20 | (2006.01) |
| A45C 13/00 | (2006.01) |
| B65D 51/16 | (2006.01) |

(52) U.S. Cl.
CPC .............. *B65D 25/04* (2013.01); *A45C 11/20* (2013.01); *A45C 13/008* (2013.01); *A45C 13/02* (2013.01); *A47J 47/08* (2013.01); *B65D 51/16* (2013.01)

(58) Field of Classification Search
CPC ........ B65D 25/04; B65D 51/16; B65D 81/18; B65D 81/2092; B65D 81/263; B65D 51/1605; B65D 51/1611; B65D 51/249; A45C 11/20; A45C 13/008; A45C 13/02; A47J 47/08
USPC .................. 206/501; 426/118, 119, 120, 130
See application file for complete search history.

(56) References Cited

U.S. PATENT DOCUMENTS

| | | | |
|---|---|---|---|
| 2,487,400 A | 11/1949 | Tupper | |
| 2,695,645 A | 11/1954 | Tupper | |
| 3,942,675 A | 3/1976 | Hasegawa | |
| 4,526,290 A | 7/1985 | Cerny | |
| 4,574,174 A * | 3/1986 | McGonigle | B65D 81/3453 426/243 |
| 6,170,696 B1 | 6/2001 | Tucker et al. | |
| D618,516 S | 6/2010 | DiPietro et al. | |
| 8,157,123 B2 | 4/2012 | Tucker et al. | |
| 8,226,999 B2 * | 7/2012 | Roberts | B65D 81/3216 206/499 |
| 2012/0267369 A1 * | 10/2012 | Duvigneau | B65D 43/0204 220/795 |
| 2021/0309439 A1 * | 10/2021 | Klein | B65D 81/3283 |

* cited by examiner

*Primary Examiner* — J. Gregory Pickett
*Assistant Examiner* — Sanjidul Islam
(74) *Attorney, Agent, or Firm* — Henricks Slavin LLP

(57) ABSTRACT

A food container including a receptacle defining a first storage volume and a second storage volume, a cover configured to be secured to the receptacle, and a gas diversion system located between the first storage volume and the second storage volume when the cover is secured to the receptacle.

8 Claims, 6 Drawing Sheets

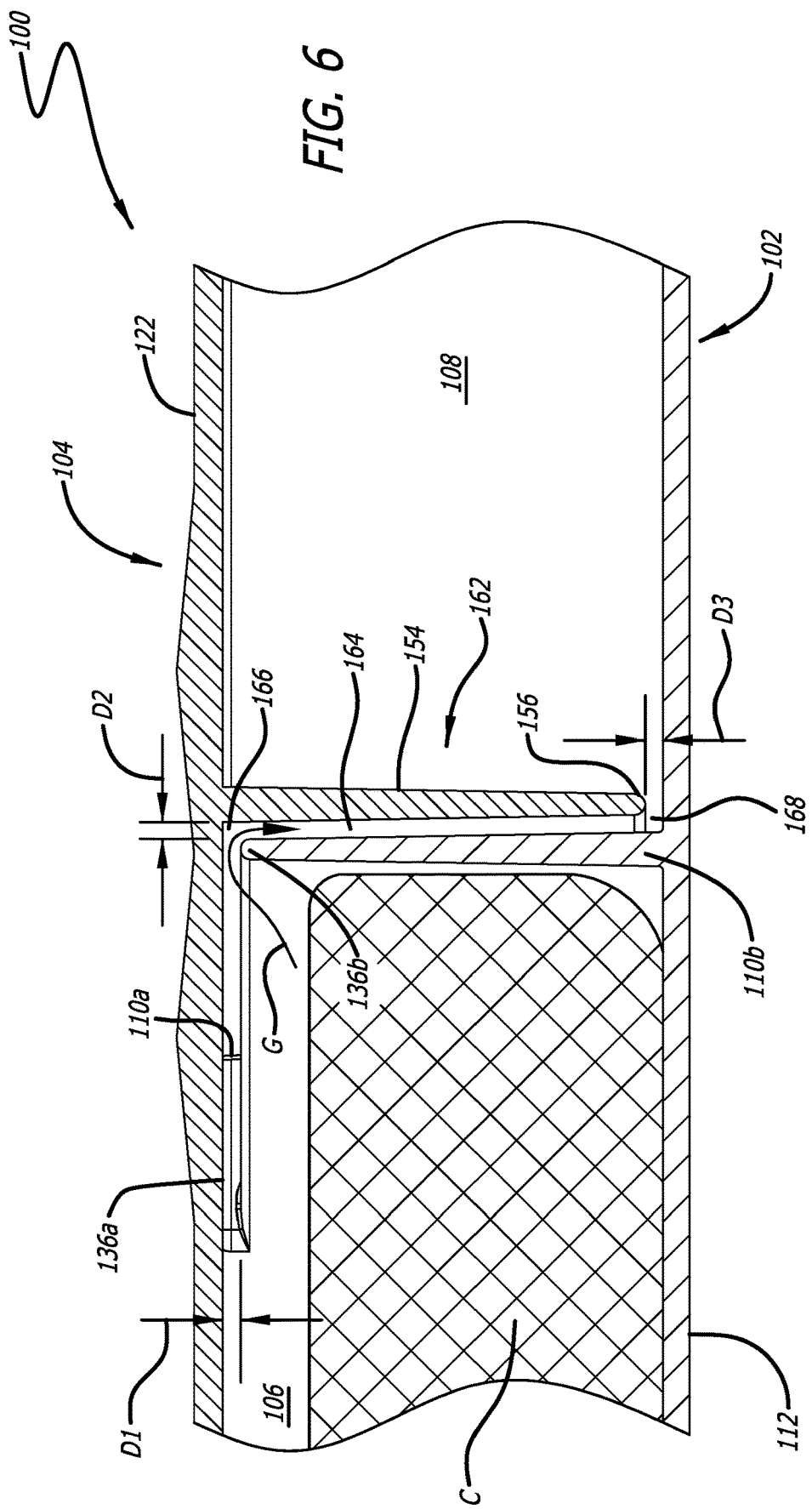

FOOD CONTAINERS WITH GAS DIVERSION

BACKGROUND

1. Field

The present inventions relate generally to food containers.

2. Related Art

Some foods emit unpleasant odors. By way of example, but not limitation, so-called "washed-rind" cheeses such as Chambertin and Limburger are washed in a salty brine solution during the maturation process. The resulting moist and salty environment attracts, among others, bacteria called *Brevibacterium* linens. The bacteria break down the protein on the outer layer (or "rind") of the cheese at room temperature, which releases unpleasant smelling gasses. This process is sometimes referred to as "ripening." Other cheeses that release unpleasant smelling gasses as they ripen are Camembert and Robiola Bosina. The unpleasant smelling gasses can be problematic when, for example, the cheese is placed in a dish at a party or is carried to a picnic or other event.

The present inventor has determined that conventional methods of containing unpleasant smelling food gasses are susceptible to improvement. In the exemplary context of "washed-rind" cheese, the cheese may be placed in a small sealed container that is approximately equal in volume to the cheese itself. The present inventor has determined that the unpleasant smelling gasses produced as the cheese ripens will eventually escape from the container due to the increase in gas pressure within the container.

SUMMARY

A food container in accordance with at least one of the present inventions includes a receptacle defining a first storage volume and a second storage volume, a cover configured to be secured to the receptacle, and a gas diversion system located between the first storage volume and the second storage volume when the cover is secured to the receptacle.

A food container in accordance with at least one of the present inventions includes a receptacle including a closed curve wall defining an apex, a first side wall extending from the closed curve wall, a second side wall extending from the closed curve wall, and an end wall extending from the first side wall to the second side wall, wherein a first storage volume is defined within the closed curve wall and a second storage volume is defined by the first side wall, second side wall and the closed curve wall, the second storage volume having a rectangular region and first and second generally triangular regions on opposite sides of the apex, and a cover configured to be secured to receptacle.

BRIEF DESCRIPTION OF THE DRAWINGS

Detailed description of preferred embodiments of the inventions will be made with reference to the accompanying drawings.

FIG. 6 is an enlarged view of a portion of FIG. 5.

DETAILED DESCRIPTION OF THE EXEMPLARY EMBODIMENTS

The following is a detailed description of the best presently known modes of carrying out the inventions. This description is not to be taken in a limiting sense, but is made merely for the purpose of illustrating the general principles of the inventions.

Figure 1:
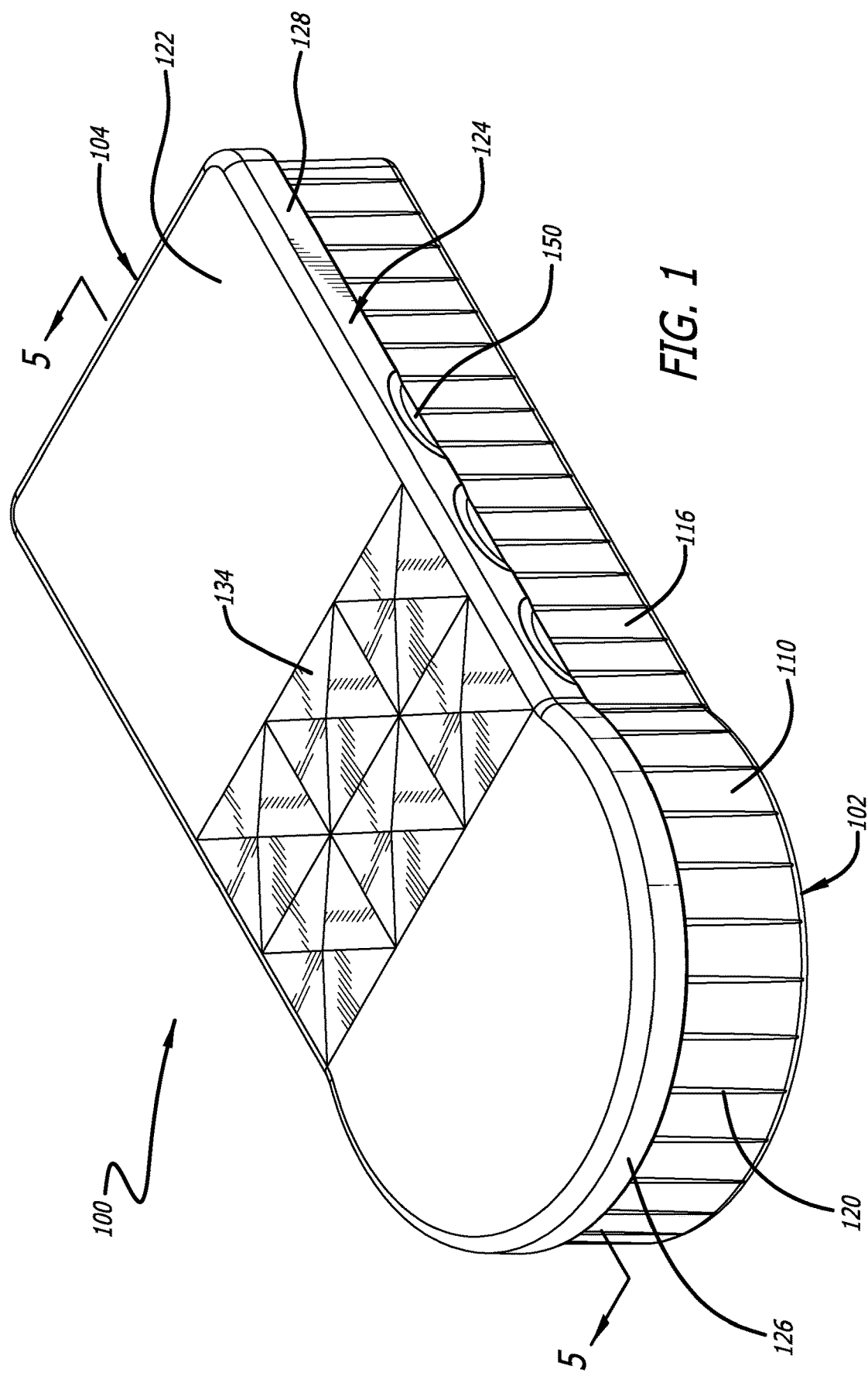
FIG. 1 is a perspective view of a food container in accordance with one embodiment of a present invention.
Figure 2:
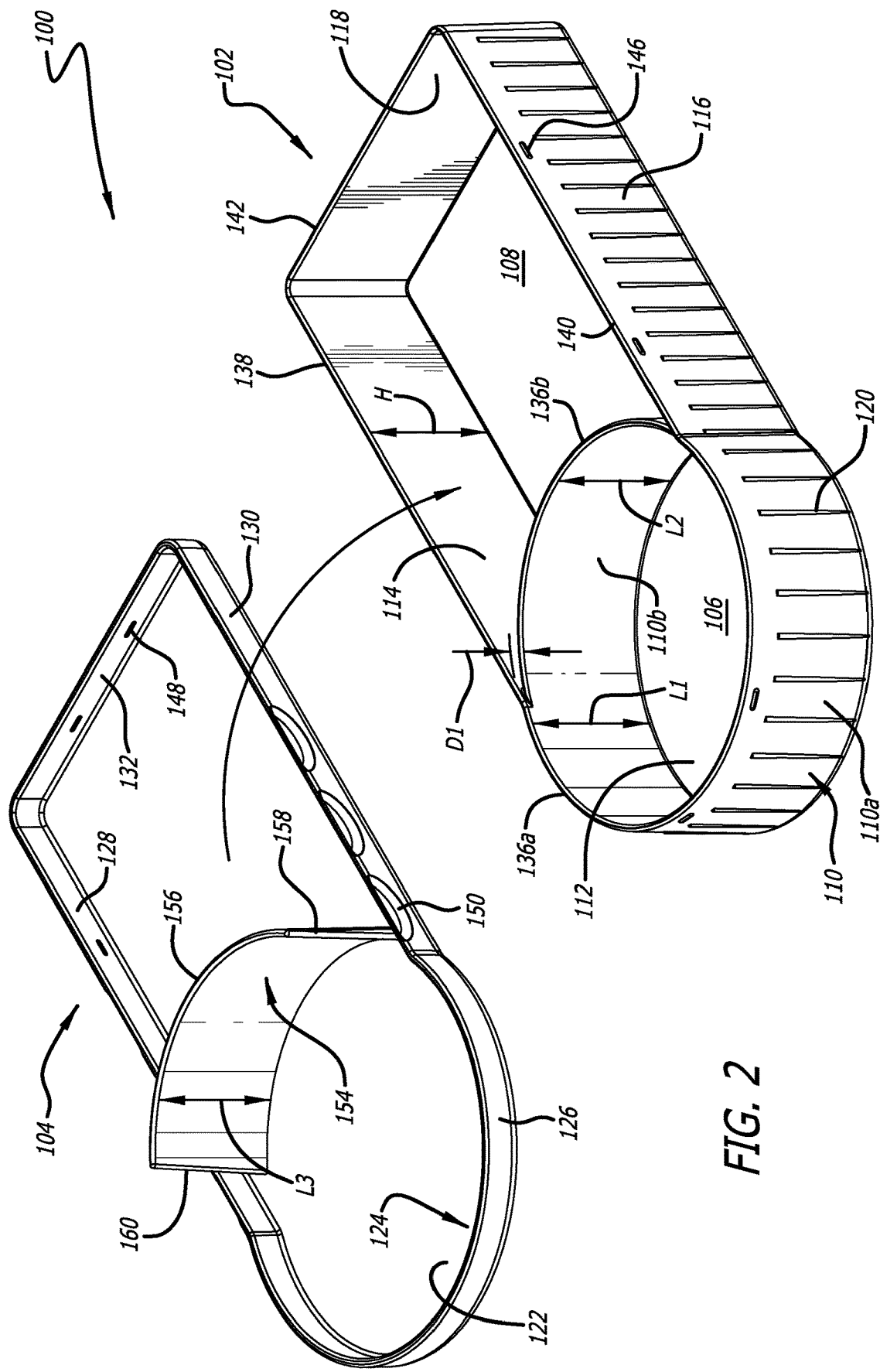
FIG. 2 is an exploded perspective view of the food container illustrated in FIG. 1.

A food container in accordance with one embodiment of the present inventions is generally represented by reference numeral 100 in FIGS. 1 and 2. The exemplary food container 100 includes a receptacle 102 and a cover 104. The receptacle 102 in the illustrated implementation includes a first storage volume 106 and a second storage volume 108. Although the present inventions are not limited to use with any particular foods, the first storage volume 106 may be used to store a wheel of cheese, such as a wheel of "washed-rind" cheese, while the second storage volume 108 may be used to store crackers, a sandwich, vegetables, and fruits. The exemplary food container 100 also includes a gas diversion system that is discussed below with reference to FIGS. 5 and 6. The gas diversion system is configured to store gas generated in first storage volume 106 at a location between the first and second storage volumes 106 and 108, thereby reducing the likelihood that, for example, unpleasant smelling gasses associated with ripening cheese in the first storage volume will escape from the food container 100 or adversely effect the food stored in the second storage volume.

The first storage volume 106 of the receptacle 102 in the illustrated embodiment is defined by a closed curve wall 110 with portions 110a and 110b, such as a circular wall (as shown) or an oval wall, and a bottom wall 112. The second storage volume 108 is defined the closed curve wall portion 110b (or by the curved wall 154 discussed below then the cover 104 is on the receptacle), the bottom wall 112, first and second side walls 114 and 116, and an end wall 118. The first and second side walls 114 and 116 and the end wall 118 are of the same height H and are linear, and there are right angles between the side walls and the end wall. The closed curve wall portions 110a and 110b of the closed curve wall 110, which meet at the ends of the side walls 114 and 116, define respective lengths L1 and L2. Length L1 is equal to the height H. The outer surfaces of the walls 110, 114, 116 and 118, i.e., the surfaces that define exterior surfaces of the container 100, may also include reinforcing ribs 120 in some embodiments. The ribs 120 may be tapered (as shown) or have a constant thickness. The exemplary cover 104 includes a top wall 122 and a rim 124 with a curved portion 124, side portions 126 and 128, and an end portion 130. In some instances, a decorative surface 134 may also be provided.

The exemplary food container 100 is in a closed state when the cover 104 is positioned on the receptacle 102 in the manner illustrated in FIG. 1. Here, the inner surface of the top wall 122 rests on the top end 136a of the closed curve wall portion 110a as well as the top ends 138, 140 and 142 of the side walls 114 and 116 and the end wall 118. Given the difference between the lengths L1 and L2 of the closed curve wall portions 110a and 110b, the top end 136b of portion 110b is offset from top end 136a of portion 110a by distance D1, and the inner surface of the cover top wall 122 does not come into contact with the top end 136b, as is discussed in greater detail below with reference to FIGS. 5 and 6.

A gas-tight seal is formed between the receptacle 102 and cover 104 when the food container 100 is in the closed state illustrated in FIG. 1. To that end, the exemplary food container 100 may be provided with any suitable device that locks, latches or is otherwise configured to secure the cover 104 to receptacle 102 such that the cover may be removed from the receptacle, i.e., such that the cover is removably secured to the receptacle. The illustrated embodiment is provided with a latch system that includes a plurality of protrusions 146 and a corresponding plurality of indentations 148. The protrusions 146 may be located on the outer surfaces of the closed curve wall portion 110a, the side walls 114 and 116, and the end wall 118 of the receptacle 102, while the indentations 148 may be located on the inner surfaces of the curved portion 126, the side portions 126 and 128, and the end portion 130 of the cover rim 124. The respective locations of the protrusions 146 and indentations 148 may also be reversed or alternated. In any case, the protrusions 146 and indentations 148 are located on the receptacle 102 and cover 104 in such a manner that the top wall 122 of the cover is held firmly against the top end 136a of the closed curve wall portion 110a as well as the top ends 138, 140 and 142 of the side walls 114 and 116 and the end wall 118. Additionally, the respective dimensions of the receptacle 102 and the cover 104 are such that the rim 124 is firmly against the corresponding portions of the receptacle closed curve wall 110, the side walls 114 and 116, and the end wall 118 after the cover 104 has been pressed onto the receptacle 102. Holding the cover top wall 122 and rim 124 firmly against the associated portions of the receptacle 102 creates the gas-tight seal. Indentations 150 on the cover rim 124 may be used to augment the user's grip during removal of the cover 104.

Figure 3:
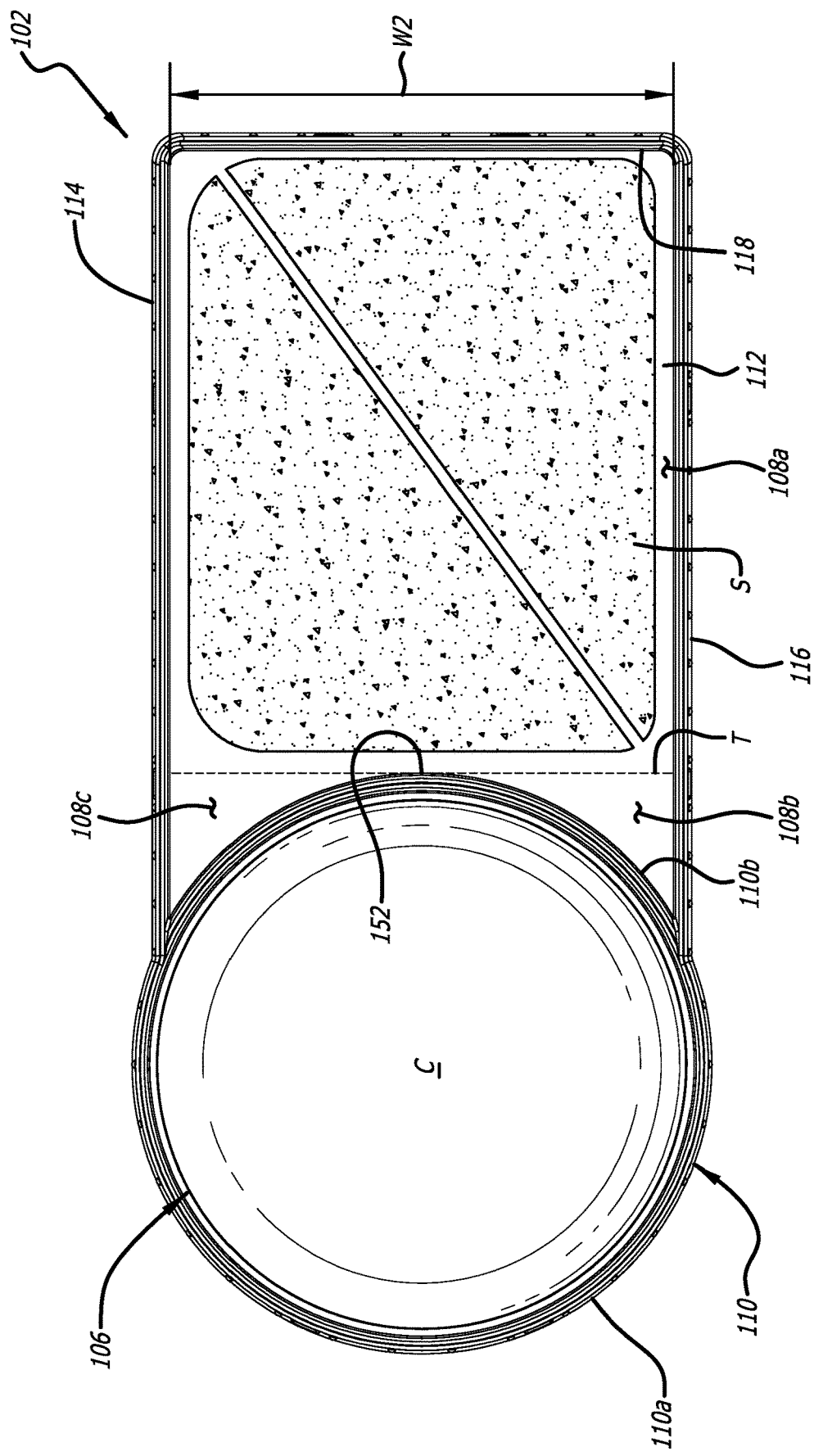
FIG. 3 is a top view of a portion of the food container illustrated in FIG. 1.

Turning to FIG. 3, which shows the exemplary receptacle 102 holding a wheel of cheese C in the first storage volume 106 and a sandwich S in the second storage volume 108, the second storage volume 108 is defined on three sides by the walls 114, 116 and 118 and, because the cover 104 is detached, on one side by the closed curve wall portion 110b. As such, the outer perimeter of the second storage volume 108 includes three straight sides and an arcuate side that projects into the second storage volume 108 toward the end wall 118. The apex 152 of the closed curve wall portion 110b is centered relative to the side walls 114 and 116. As a result, the second storage volume 108 has a rectangular region 108a that extends from the side wall 114 to the side wall 116 and from the end wall 118 to the tangent T of the apex 152 (shown with a dashed line) as well as a pair of generally triangular regions 108b and 108c that extend from the tangent T to the closed curve wall portion 110b on opposite sides of the apex 152. As used herein, a "generally triangular region" is a region with three sides formed by lines that may be either straight or curved.

The exemplary storage volume 108 is advantageous as compared to a storage volume this is solely rectangular in, for example, those instances where the sandwich (or other food item) is wedged into a solely rectangular storage volume or simply occupies enough of the solely rectangular storage volume to make it difficult to place a finger between the sandwich S and an adjacent wall. In such a situation, the user of a conventional container would have to turn the receptacle over and possibly spill the cheese (or other food item) that is in an adjacent storage volume in order to remove the sandwich. The use of a curved wall with an apex that extends into a storage volume in the present container 100 (the curved wall portion 136b with apex 152), on the other hand, results in regions (the generally triangular regions 108b and 108c) that will remain open and free of food when the sandwich S abuts the apex. The user can place a finger into one of the triangular regions 108b and 108c, or a finger into both of the triangular regions, then under the sandwich S or other food item, and then pull the sandwich S or other food item out of the storage volume 108 without turning the receptacle 102 upside down.

Figure 4:
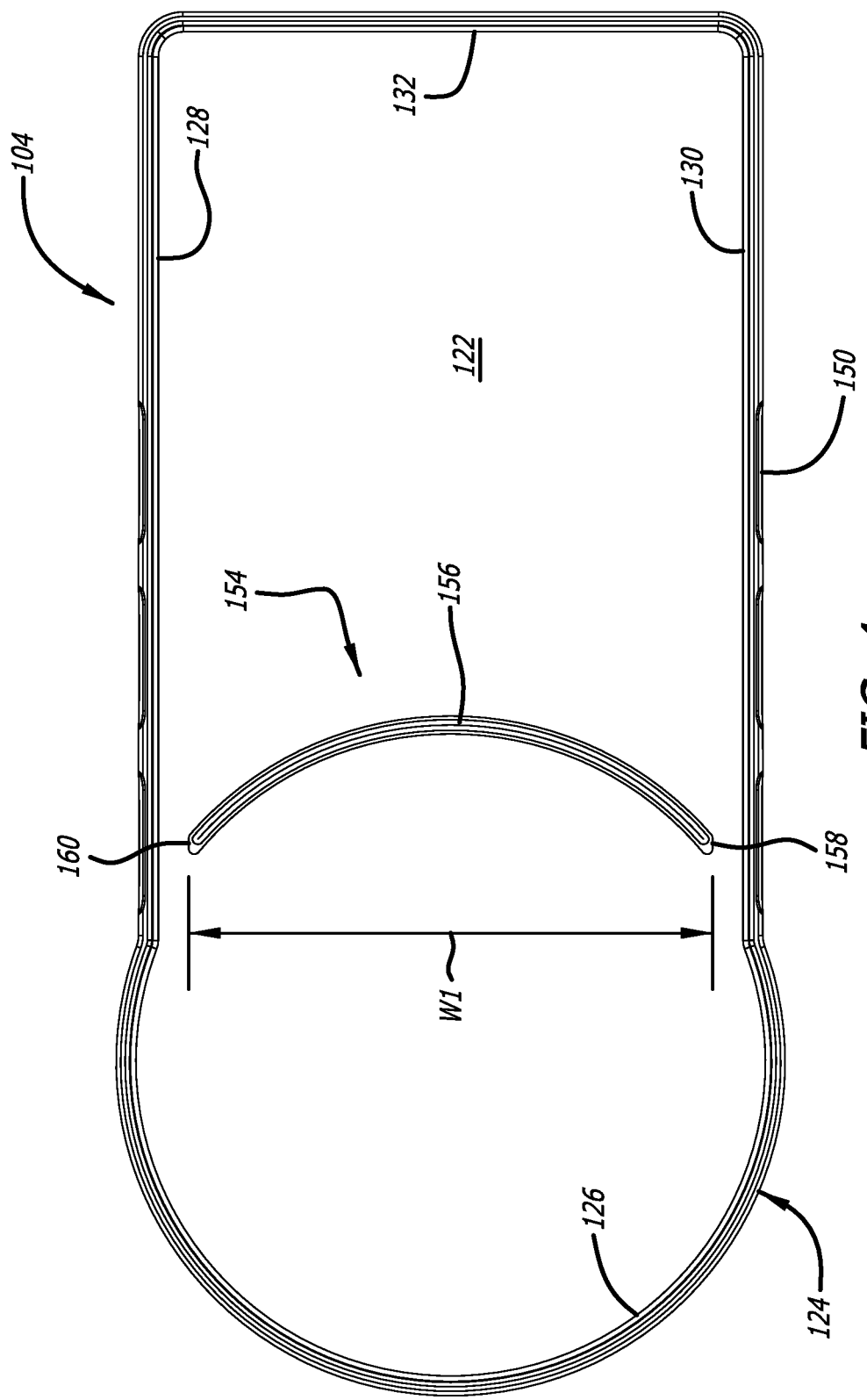
FIG. 4 is a bottom view of a portion of the food container illustrated in FIG. 1.

Referring to FIGS. 2 and 4, the exemplary cover 104 includes a curved wall 154 that extends downwardly from the top wall 122 when the food container 100 is in the closed state illustrated in FIG. 1. The curved wall 154 forms part of the gas diversion system that is discussed below with reference to FIGS. 5 and 6, and includes a bottom end 156 and first and second side ends 158 and 160. The curvature of the wall 154 may be the same as that of the closed curve wall portion 110b. In the illustrated embodiment, the curved wall 154 in the shape of an arc of a circle. The width W1 (FIG. 4) of the curved wall 154 may be equal to the width W2 (FIG. 3) of the rectangular region 108a of storage volume 108 or the width W1 may be slightly less than the W2 (as shown) for manufacturing tolerance and ease of use purposes. The length L3 of the curved wall 154 is the same as the length L2 of the curve wall portion 110b in the illustrated embodiment, but may be different in other embodiments.

Figure 5:
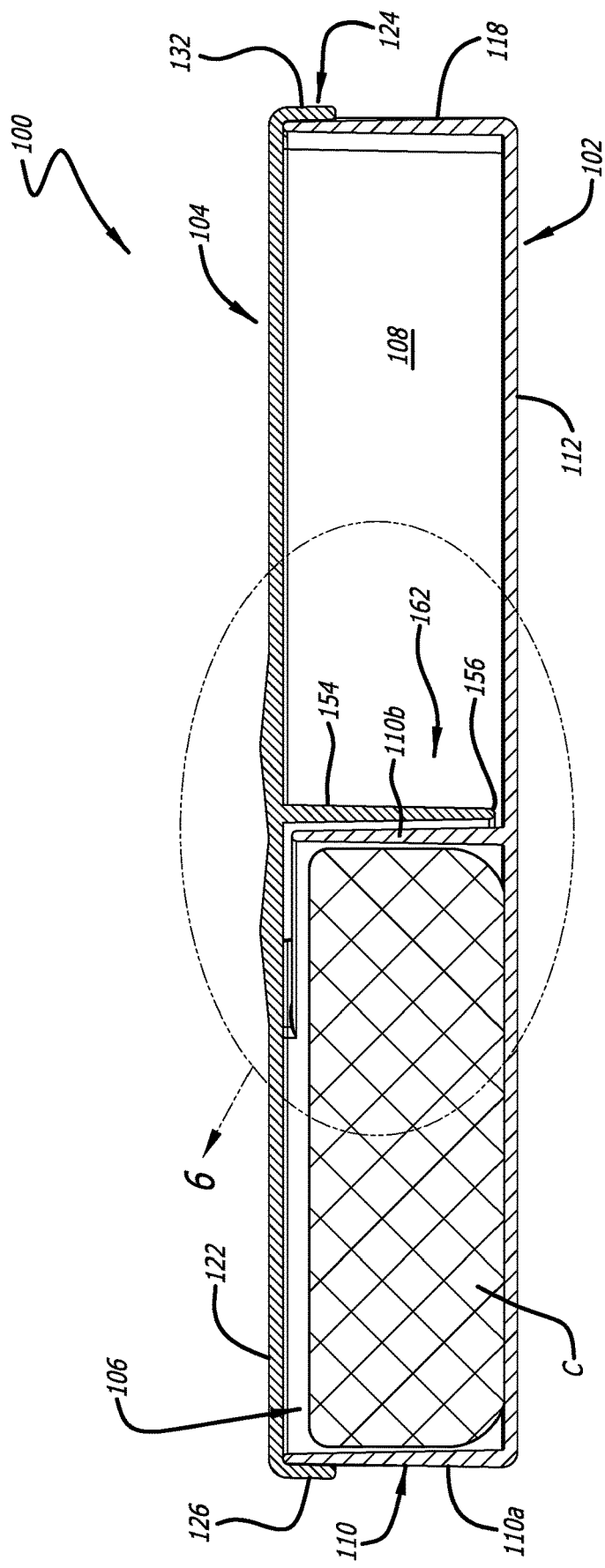
FIG. 5 is a section view taken along line 5-5 in FIG. 1.

Turning to FIGS. 5 and 6, the exemplary food container 100 includes a gas diversion system 162, located between the first storage volume 106 and the second storage volume 108 when the cover 104 is attached to the receptacle 102, that is configured to allows gas (or gasses) associated with the cheese or other food located in the first storage volume 106 to vent from the first storage volume without escaping from the food container or entering the second storage volume 108 when the container is in a closed state illustrated in FIGS. 1, 5 and 6. The gas diversion system 162 thereby reduces the likelihood that, for example, unpleasant smelling gasses associated with ripening cheese in the first storage volume 106 will escape from the food container 100 or adversely effect the food stored in the second storage volume 108.

The gas diversion system 162 in the illustrated embodiment includes the closed curve wall portion 110b of the receptacle 102, the curved wall 154 of the cover 104, and various spaces and volumes associated therewith. To that end, a gas storage volume 164 is located between the receptacle curved wall portion 100b and the cover curved wall 154, which are separated from one another by a distance D2. The gas storage volume 164 extends laterally from the first side end 158 (FIG. 2) of the curved wall 154 to the second side end 160, and vertically from the top end 136b of the closed curve wall portion 110b to the bottom end 156 of the curved wall 154.

The first storage volume 106 is connected to the top of the gas storage volume 164 in the exemplary implementation by a gap (or "opening") 166 between the top end 136b of the closed curve wall portion 110b and the inner surface of the cover top wall 122. The inner surface of the cover top wall 122 rests on the top end 136a of the closed curve wall portion 110a when the container 100 is in a closed state and, accordingly, the height of the gap 166 is equal to the distance D1 between the top end 136a and the top end 136b of the closed curve wall portion 110b. The gap 166 also extends laterally from the first side end 158 (FIG. 2) of the curved wall 154 to the second side end 160. The bottom end 156 of the curved wall 154 is separated from the inner surface of the receptacle bottom wall 112 by a distance D3. The second storage volume 108 is connected to the bottom of the gas storage volume 164 by a gap 168 between the bottom end 156 of the curved wall 154 and the inner surface of the receptacle bottom wall 112. The gap 168 extends laterally from the first side end 158 (FIG. 2) of the curved wall 154 to the second side end 160.

As noted above, a gas-tight seal is formed between the receptacle 102 and cover 104 when the food container 100 is in the closed state illustrated in FIG. 1. The pressure within the first storage volume 106 will, therefore, increase as the cheese C ripens and gas is produced. Some of the gas G within the first storage volume 106 will pass through the gap 166 and into the gas storage volume 164, thereby displacing some of the air initially within the gas storage volume 164 through the gap 168 and into the second storage volume. The pressure within the second storage volume 108 will increase accordingly. The ripening process will continue to produce gas and, over time, more and more gas G from the first storage volume 106 will enter the gas storage volume 164 by way the gap 166. Corresponding pressure increases within the second storage volume 108 prevents ingress of the gas G into the second storage volume by way of the gap 168. Although some of the gas G produced by the ripening process may eventually reach the second storage volume, the inventor herein has determined that, in typical use conditions, the user will remove the cover 104 in order to consume some of the cheese C prior to this occurring.

Food containers in accordance with the present inventions may be formed from any suitable material and may be any size that conforms with the intended usage. Suitable materials include, but are not limited to, food-grade plastics such as High-Density Polyethylene (HDPE), Polyetheretherketone (PEEK) and Polypropylene (PP). In one exemplary implementation, the exterior food container 100 may be about 9.68 inches long, about 4.36 inches wide at the rectangular portion of the top wall 122, about 4.66 inches wide at the curved portion of the top wall 122, and about 1.75 inches tall. As used here in the context of dimensions, the word "about" means+\1 10%. With respect to the interior of the exemplary food container 100, the length L1 is about 1.65 inches, the length L2 is about 1.59, and the length L3 is about 1.59 while the distance D1 is about 0.063 inch, the distance D2 is about 0.063 inch, and the distance D3 is about 0.063 inch. Additionally, the lengths L1 to L3 and the distances D1 to D3 may be adjusted to achieve particular gas venting objectives. By way of example, but not limitation, the distance D3 may be smaller than the distance D1. It should also be noted that in those instances where width W1 is slightly less than the W2, the difference may be about 0.13 inches, which will result in small spaces through which only an insignificant amount of gas will pass.

Although the present inventions have been described in terms of the preferred embodiments above, numerous modifications and/or additions to the above-described preferred embodiments would be readily apparent to one skilled in the art. By way of example, but not limitation, the receptacle and cover may, in other embodiments, be secured to one another in any of a variety of ways such as, for example, those illustrated in U.S. Pat. Nos. 2,695,645, 3,942,675, 4,526,290, 6,170,696 and 8,157,123, which are incorporated herein by reference. Alternatively, or in addition, some embodiments may include more than two storage volumes. Alternatively, or in addition, all of the storage volumes may be rectangular. The present inventions also include systems that combine any of the containers described above and/or claimed below with a wheel or other quantity of cheese. It is intended that the scope of the present inventions extends to all such modifications and/or additions.

Also, with respect to terminology that may be used herein, whether in the description or the claims, the following should be noted. The terms "comprising," "including," "carrying," "having," "containing," "involving," and the like are open-ended and mean "including but not limited to." Ordinal terms such as "first", "second", "third," do not, in and of themselves, connote any priority, precedence, or order of one element over another or temporal order in which steps of a method are performed. Instead, such terms are merely labels to distinguish one element having a certain name from another element having a same name (but for the ordinal term) to distinguish the elements. "And/or" means that the listed items are alternatives, but the alternatives also include any combination of the listed items. The terms "approximately," "about," "substantially" and "generally" allow for a certain amount of variation from any exact dimensions, measurements, and arrangements, and should be understood within the context of the description and operation of the invention as disclosed herein. Terms such as "top," "bottom," "upper," "lower," "above," and "below" are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, or any other rotational variation therefrom.

I claim:

1. A food container, comprising:
    a receptacle including a bottom wall defining a first storage volume and a second storage volume;
    a cover including a top wall configured to be secured to the receptacle; and
    a gas diversion system located between the first storage volume and the second storage volume when the cover is secured to the receptacle, the gas diversion system including
        a first wall extending upwardly from the receptacle bottom wall and defining a top end and a length that extends from the bottom wall to the top end, the top end being adjacent to, and spaced apart from, the cover top wall such that there is a first gap between the first wall top end and the cover top wall,
        a second wall, spaced apart from the first wall in a direction perpendicular to the first wall length, extending downwardly from the cover top wall and defining a bottom end and a length that extends from the cover top wall to the bottom end, the bottom end being adjacent to, and spaced apart from, the receptacle bottom wall such that there is a second gap between the second wall bottom end and the receptacle bottom wall, the second wall being coextensive with the first wall along the lengths of the first and second walls between the first gap and the second gap, and
        a gas storage volume located between the first and second walls and the first and second gaps, from the first wall top end to the second wall bottom end, that is connected to the first storage volume by the first gap and is connected to the second storage volume by the second gap.

2. A food container as claimed in claim 1, wherein the receptacle and the cover are respectively configured such that an airtight seal is created between the receptacle and the cover when the cover is secured to the receptacle.

3. A food container as claimed in claim 1, wherein the first and second walls are curved.

4. A food container as claimed in claim 1, wherein the first storage volume is defined by a closed curve wall including the first wall, which defines a first portion of the closed curve wall and second portion that in conjunction with the first portion forms the closed curve wall; and the second portion of the closed curve wall defines a second portion length that is less than the length of the first wall.

5. A food container as claimed in claim 4, wherein the length of the second wall is equal to the length of the second portion of the closed curve wall.

6. A food container as claimed in claim 4, wherein the second storage volume is defined by a first side wall, a second side wall, an end wall that extends from the first side wall to the second side wall, and the second portion of the closed curve wall.

7. A food container as claimed in claim 6, wherein the first side wall, the second side wall and the end wall define equal heights that are equal to the closed curve wall first portion length.

8. A food container as claimed in claim 6, wherein the closed curve wall second portion defines an apex; and the second storage portion includes a rectangular region and first and second generally triangular regions on opposite sides of the apex.

* * * * *